May 21, 1968     P. D. OWEN     3,383,809
TOOL GRINDING APPARATUS
Filed May 20, 1965     2 Sheets-Sheet 1
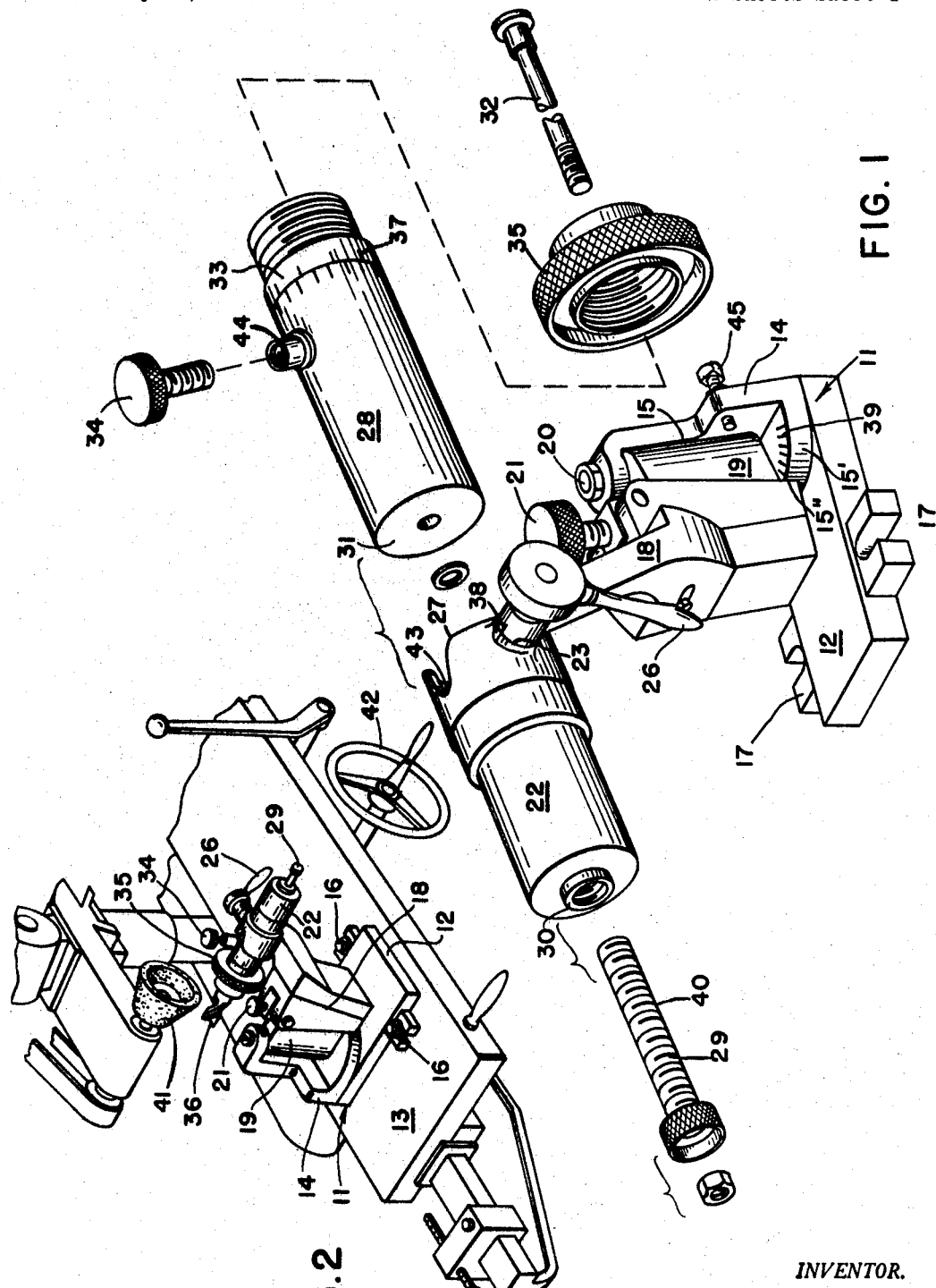
INVENTOR.
PAUL D. OWEN
BY May 21, 1968  P. D. OWEN  3,383,809
TOOL GRINDING APPARATUS
Filed May 20, 1965  2 Sheets-Sheet 2

INVENTOR.
PAUL D. OWEN
BY *David Rahn*

United States Patent Office 3,383,809
Patented May 21, 1968

3,383,809
TOOL GRINDING APPARATUS
Paul D. Owen, 539 Highland Ave.,
Greensboro, N.C. 27403
Filed May 20, 1965, Ser. No. 457,429
10 Claims. (Cl. 51—220)

ABSTRACT OF THE DISCLOSURE

This invention relates to tool grinding attachments and relates more particularly to a tool and cutter grinder for sharpening and shaping tools, ball end mills, router bits, die punches, bolt extractors, and the like, the tool grinder having swivel means, a vertically pivotal rotatable sleeve and a movable piston for positioning an article held for grinding horizontally, vertically, obliquely and rotationally against a grinding surface.

BACKGROUND AND OBJECTS OF THE INVENTION

There is normally a substantially expenditure for tool replacement in machining operations since after prolonged use, end mills, fluted reamers, drill bits, die punches, among other tools, are discarded as the cost of sharpening or grinding such tools is prohibitive as compared to the cost of replacing such tools. In machine shops where sharpening and grinding of such tools are undertaken, the procedure is to hold the cutting edges of the tools against a motor-driven grinding wheel having a suitable abrasive surface. The grinding is usually accomplished without the aid of any accurate tool supporting member, and frequently the life and cutting properties of the tool are appreciably reduced due to the inaccurate sharpening operations. Additionally, the highly developed furniture and woodworking industry also requires that tools used in this particular field be precisioned ground to a high degree of sharpness and accuracy.

Additionally, shaping and sharpening ball end mills is a particularly difficult task under conventional methods since this is primarily a manual operation and subject to the inherent defects of such a procedure.

It is, therefore, an object of this invention to provide an apparatus for supporting various tools for sharpening or grinding in which the supported tool may be rotated and positioned to generate the desired angle or pitch to the tool to be sharpened against a tool grinding wheel having an abrading surface.

Another object of this invention is to provide an attachment mountable on a horizontally reciprocable table for juxtaposing a tool or cutter bit to a revolving grinding wheel having an abrading surface at the angle of rotation to sharpen the desired cutting edges or surfaces of the tool or cutter bit.

Still another object of this invention is to provide an apparatus for supporting various tools for sharpening or grinding which has the strength and sturdiness necessary to maintain rigidly an article for grinding in a precise preselected position.

A further object of this invention is to provide a tool and cutter bit sharpening attachment for presenting a tool or cutter bit to a grinding wheel having an abrading surface in which the tool may be indexed at the desired angle and presented to the grinding wheel at the desired angle of rotation and pitch corresponding to the tool.

Yet another object of this invention is to provide an apparatus for supporting a tool or cutter, particular ball end mills, for sharpening and presenting the tool or end mill ball to a motor-driven grinding wheel by controlling the angle of tool rotation corresponding to the helix or pitch of the tool or end mill in order to sharpen the cutting edge thereof.

Yet still another object of the present invention is to provide an apparatus for supporting a tool for sharpening that is easily moved from place to place for maximum utility within a workshop.

Other objects and many of the attendant advantages of this apparatus for grinding tools and cutters will become more readily apparent to those skilled in the machine tool and grinding technology from the following detailed description taken in conjunction with the accompanying drawings in which like characters of reference designate corresponding parts throughout the several views, and wherein:

FIGURE DESCRIPTION

FIG. 1 is a front elevational and perspective exploded view of a tool and cutter grinding apparatus illustrating the piston head and head positioning pin removed from the carrying sleeve.

FIG. 2 is a perspective view of a tool and cutter grinding apparatus and table combination on which the tool supporting grinder attachment embodying this invention is mounted.

DETAILED DESCRIPTION OF THE INVENTION

Figure 3:
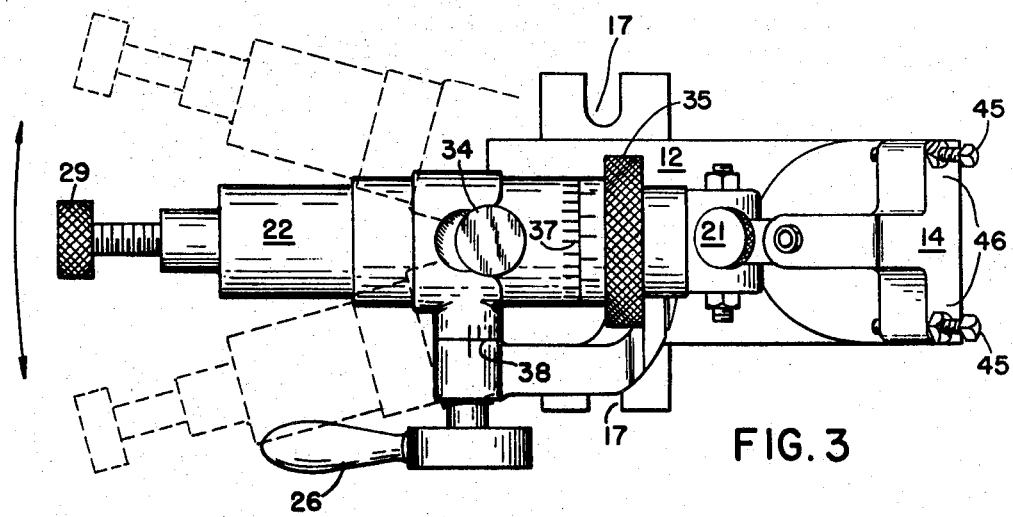
FIG. 3 is a top plan view of a tool and cutter grinding apparatus illustrating the limits in which the sleeve and carried piston head may be pivoted to position an article for grinding against an abrading surface.

Referring now to the drawings and more particularly to FIG. 1, there is illustrated the tool and cutter grinding attachment with the attachment shown as having a base member generally designated 11 which is comprised of a substantially horizontal portion 12 for flat uniform contact with a working surface or table 13 (FIG. 2) and a substantially vertical portion 14 formed at one end of horizontal portion 12. The vertical portion 14 is fabricated to form a hinge-receiving recess 15, having a base 15′ which is arcuately ground to allow a cooperating edge 15″ of swivel arm 18 to rotate thereabout. The horizontal portion 12 of base 11 is rigidly secured to working surface or table 13 by bolts generally designated 16 as shown in FIG. 2 which extend through locking flanges 17 and table 13.

Figure 4:
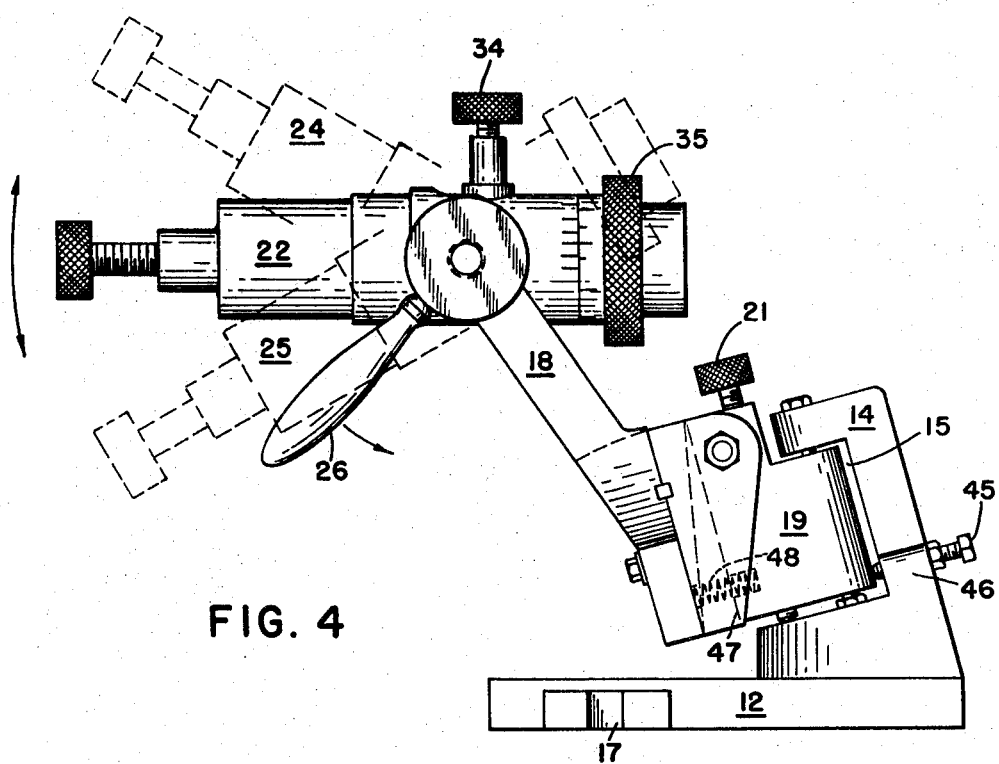
FIG. 4 is a side elevational view of a tool and cutter grinding apparatus illustrating the pivotal movement within the limits of the sleeve and carried piston head with respect to the support base and swivel arm.

An irregularly shaped swivel arm 18 is supported by the vertical base portion 14 by having a swivel arm hinge 19 cooperatively received by hinge-receiving recess 15. An elongated locking pin 20 maintains swivel arm 18 in pivotal alignment within recess 15 of vertical member 14, and, as best illustrated in FIG. 4, the longitudinal axis of the pin 20 extends obliquely, i.e., neither horizontally nor vertically but inclined upwardly to permit pivotal rotation of the swivel arm 18 with respect to the base member 11. A locking thumb screw 21 allows the swivel arm to be rigidly held in any selected pivoted position.

A cylindrical piston sleeve 22 is pivotally secured at junction 23 to swivel arm 18. Sleeve 22 may pivot between upper limit 24 and lower limit 25 (FIG. 4) allowing maximum angular elevational positioning of an article to be held against an abrading surface for grinding. A manually operated locking lever 26 provides means for rigidly securing sleeve 22 in any selected position between limits 24 and 25. Sleeve 22 has an open end 27 that slidably and cooperatively receives a piston head 28 which may be selectively displaced within sleeve 22 by means of a threaded thumbscrew 29 which extends through the other substantially closed end 30 of sleeve 22. Thumbscrew 29 interlocks with substantially closed end 31 of piston head 28 and is secured thereagainst by means of stud 32 which is threadably received within the drilled and tapped thumbscrew 29. Substantially closed end 30 of sleeve 22 also threadably receives thumbscrew 29 so that by rotating that thumbscrew, piston head 28 may be advanced or retracted within sleeve 22 as the grinder operator elects.

The forward portion 33 of piston head 28 is rotatably mounted to that member and can be selectively secured by means of upper thumbscrew 34.

A locking nut 35 is threadably received by forward portion 33 to maintain an article to be ground 36 (FIG. 2) rigidly within. Locking nut 35 is of a convenient size so as to allow manual adjustment thereof without the assistance of a wrench or piston tool.

For extremely close tolerance work, a graduated index 37 is inscribed between the piston head 28 and its forward rotatable portion 33 to enable an operator to precisely turn portion 33 the required number of degrees. A similar graduated index 38 is provided between sleeve 22 and swivel arm 18 to enable the operator to again precisely determine the amount of elevation needed or desired. Another graduated index 39 provides the operator with visual assurances of the amount of horizontal pivotable movement, and obviously threaded thumbscrew 29 carries calibrations to determine the displacement of piston head 28 within sleeve 22.

Working surface 13 illustrated in FIG. 2 shows a conventional machine shop or lathe table that is best utilized in conjunction with the present invention. Abrader surface 41 is normally maintained some distance above the grinder so that the elevational, horizontal and rotational movement offered by the present invention can be used with maximum efficiency. A movable means 42 to displace the entire working surface and carry grinder offers additional versatility to the present device.

Obviously, the fixed limits of pivotal movement of the present device can be extended by minor structural variations, however, there appears to be no need for this modification since by combining one or more of the movements available, any position with respect to an abrading surface may be achieved.

Note that sleeve 22 has a recess or slot 43 which allows thumbscrew-receiving aperture 44 to be cooperatively received when piston head 28 is retracted within sleeve 22 in its furthermost interior position.

Positioning screws 45 are threadably received on edges 46 of vertical member 14 to provide preselected stops for swivel arm hinge 19 as it pivots horizontally through approximately 180 degrees. Additionally, swivel arm 18 is biased away from the lower edge 47 of swivel arm hinge 19 by a helical spring 48 so that a previously aligned tool for grinding can be inspected by simply pulling swivel arm 18 and its carried components and tool back and away from the abrading surface without removing the tool. This obviates a realignment of the carried tool within the holding components upon its return to the grinder or abrading surface. The force exerted by spring 48 when compressed will automatically return the tool and holding components to its previous precice position.

Obviously, many modifications and variations may be made in the construction and arrangements of the swivel arm, base member, and sleeve as well as the piston head as well as the other phases of the present inventive concept in light of the above teachings without departing from the real spirit and purpose of this invention. Such modifications of parts and alternatives as well as the use of mechanical equivalents to those herein illustrated and described are reasonably included and modifications are contemplated.

I claim:

1. An adjustable grinder for supporting and positioning an article held for grinding comprising in combination: a base having an upstanding swivel arm support having a hinge receiving recess formed thereon; a swivel arm received within said recess for oblique pivotal movement between limits relative to said base; a tubular sleeve adjustably connected to said swivel arm for pivotal movement in a substantially vertical plane between limits; a piston head slidably carried by said sleeve for adjustable relative movement with respect thereto, said head including means for adjustably rotating an article held for grinding with respect to said piston head whereby the article to be ground may be horizontally, vertically, obliquely and rotationally positioned contiguous to a grinding surface.

2. An adjustable grinder for supporting and positioning an article held for grinding comprising in combination: a base; swival means pivotally secured to said base for oblique pivotal movement; sleeve means adjustably connected to said swivel means for movement relative to said swivel means in a substantially vertical plane; and piston means rotatably carried by said sleeve means for relative movement with respect to said sleeve means whereby an article held for grinding may be horizontally, vertically, obliquely and rationally secured contiguous to an abrading surface for grinding.

3. An adjustable grinder for supporting and positioning an article held for grinding comprising in combination: a base; swivel means connected to said base for oblique pivotal movement; supporting means operably connected to said swivel means for pivotal movement in a substantially vertical plane; piston means slidably disposed within said supporting means; means for displacing said piston means to said supporting means in preselected increments; and means securing an article held for grinding to said piston means for rotational movement whereby an article held for grinding may be horizontally, vertically, obliquely and rotationally positioned contiguous to an abrading surface for grinding.

4. An adjustable grinder for supporting and positioning an article held for grinding comprising in combination: a base; a swivel arm pivotally connected to said base for oblique pivotal movement with respect thereto; a cylindrical supporting sleeve adjustably connected to said swivel arm for pivotal movement thereabout in a substantially vertical plane; a piston head slidably disposed within said supporting sleeve; means for displacing said piston head with respect to said sleeve; and means for revolving an article held for grinding relative to said piston head whereby an article held for grinding may be horizontally, vertically, obliquely and rationally positioned against an abrasive surface for grinding.

5. An adjustable grinder comprising in combination: a base member having locking means for securing said base member to a working surface; an upwardly extending flange having a hinge-receiving recess therein carried by said base member; a hinge-bearing swivel arm cooperatively received by said recess for oblique pivotal movement between limits; means for securing said arm against relative movement with respect to said base member; a cylindrical supporting sleeve pivotally carried by said arm, said sleeve having a first open end and a second substantially closed end with a threaded aperture therein; means for securing said sleeve against relative movement with respect to said swivel arm; a piston head slidably disposed within said first open end, said piston head bearing a threadably attached rotatably mounted forward portion and carrying a perpendicularly affixed thumbscrew receptacle thereon; a thumbscrew cooperatively received by said receptacle, said thumbscrew securing said rotatable forward portion against relative movement with respect to said piston head; means for adjustably and movably attaching said piston head within said sleeve; and means for selectively displacing said piston head within said sleeve whereby an article for grinding is mounted for horizontal, vertical, oblique and rotatable positioning contiguous to an abrading surface for grinding.

6. An adjustable grinder and support apparatus comprising in combination: a base; an upstanding flange carried by said base; a swivel arm pivotally connected to said flange for oblique pivotal movement between limits; means for securing said arm against relative movement with respect to said base; a support sleeve pivotally secured to said arm, said sleeve having a first open end and a second closed end; means for securing said sleeve against relative movement with respect to said swivel arm; a piston head slidably disposed within said sleeve, said piston head having a rotatably mounted forward portion thereon; means for securing said piston head forward portion against relative movement with respect to said piston head; means for adjustably securing said piston head within said sleeve; and means for selectively displacing said piston head within said sleeve whereby an article for grinding is horizontally, vertically, obliquely and rotatably positioned against an abrading surface for grinding.

7. An adjustable grinder for supporting and positioning an article held for grinding comprising in combination: a base having an upstanding swivel arm support shaped thereon: a swivel arm secured to said swivel arm support oblique pivotal movement between limits; a sleeve adjustably connected to said swivel arm for pivotal movement in a substantially vertical plane between limits; a piston head slidably carried by said sleeve for relative movement with respect thereto, said head including means for adjustably rotating an article held for grinding with respect to said piston head whereby that article may be horizontally, vertically, obliquely and rotationally positioned contiguous to an abrading surface for grinding.

8. An adjustable grinder head comprising in combination; a flat angular base member having a substantially horizontal support portion and a substantially vertical upstanding portion affixed to an end of said horizontal portion, said vertical portion having a hinge-receiving recess formed therein and said horizontal portion having grinding head locking slots shaped thereon for securing said member to a working surface; a swivel arm positioned for pivotal movements between limits comprising an extruding hinge for cooperative reception within said hinge-receiving recess, said hinge having a pivot pin for pivotally retaining said hinge within said recess, a locking thumbscrew for securing said arm against relative movement with respect to said base member and an elevation locking lever; a cylindrical piston sleeve pivotally secured to said swivel arm for movement in a substantially vertical plane with respect to said swivel arm, said sleeve having a first open end and a second threaded end; a cylindrical hollow piston head slidably mounted within said sleeve first end having a rotatable forward portion, said piston head having a locking thumbscrew for securing said forward portion against rotation relative to said piston head; a piston positioning pin threadably received by said sleeve second end, said pin being secured to said piston head and moving within said sleeve when actuated to selectively displace said piston head whereby an object to be ground may be selectively urged and retracted to contact an abrading surface for grinding.

9. An adjustable grinder head comprising in combination: a base; a swivel arm secured to said base for oblique pivotal movement; means for securing said arm against relative movement with respect to said base; a support sleeve pivotally secured to said swivel; means for securing said sleeve against relative movement with respect to said arm; a piston head slidably mounted within said sleeve having a rotatable forward portion; means for securing said forward portion against rotation relative to said head; means for displacing said head with respect to said sleeve whereby an object to be ground may be horizontally, vertically, obliquely and rotatably pivoted, urged and retracted to contact an abrading surface for grinding.

10. An adjustable grinder head comprising in combination: a base member having a substantially horizontal portion and a substantially vertical portion affixed to one end of said horizontal portion, said vertical portion having a hinge-receiving recess formed therein and said horizontal portion having fastening means for securing said member to a working surface; a hinge-bearing swivel arm comprising an extruding hinge received by said vertical portion hinge-receiving recess for oblique pivotal movement, means for variably securing said arm against relative movement with respect to said base member: a cylindrical piston sleeve pivotally secured to said swivel arm for elevational movement between limits, said sleeve having a first open end and a second closed end; a cylindrical piston head slidably mounted within said sleeve, said piston head having means for rotatably supporting an article to be ground and means for selectively securing said supported article against rotation; means extending through said sleeve closed end and contacting said piston head for selectively displacing said piston head within said chamber whereby an object to be ground may be horizontally, vertically and rotatably urged against an abrasive surface for grinding.

References Cited

UNITED STATES PATENTS

| 748,651 | 1/1904 | Reimann | 51—219 |
| 1,807,999 | 6/1931 | McMurtry | 51—220 |
| 2,324,608 | 7/1943 | Walling | 51—220 |
| 2,325,364 | 7/1943 | Boening | 51—219 |
| 2,432,058 | 12/1947 | Wiken et al | 51—224 |
| 2,700,854 | 2/1955 | Detrow | 51—220 X |
| 2,907,149 | 10/1959 | Whitesel | 51—219 |
| 3,039,244 | 6/1962 | Vickerman | 51—219 |
| 3,066,456 | 12/1962 | Ramge | 51—219 |

FOREIGN PATENTS 541,433  11/1941  Great Britain.

LESTER M. SWINGLE, *Primary Examiner.*